3,188,116
PIPING JOINT

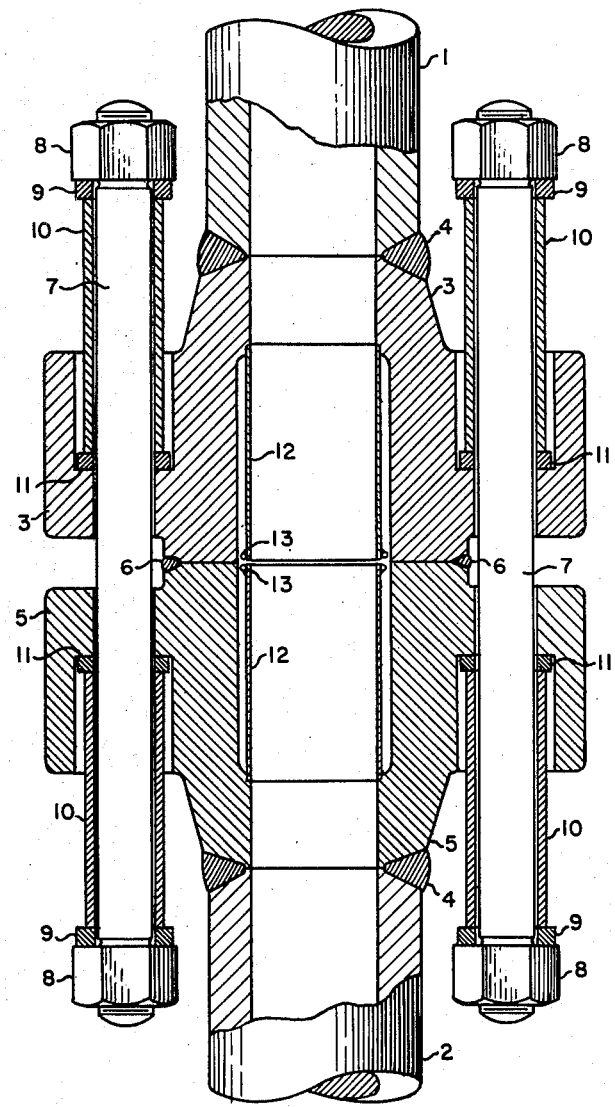

Axel Christensen, Stamford, Conn., assignor to Chemical Construction Corporation, New York, N.Y., a corporation of Delaware
Filed Aug. 3, 1962, Ser. No. 214,720
2 Claims. (Cl. 285—47)

This invention relates to a piping joint for service under conditions of extreme high pressure and high temperature. An apparatus has been developed which provides lengthy service without fluid leakage, and wherein compressive sealing force is constantly provided regardless of thermal deformation within the joint.

Numerous types of piping joints or pipe couplings have been developed in the prior art, for use under varying conditions. In general, these joints employ opposed flanged elements to provide tight closure where high pressure operating conditions are encountered. When conventional flanged joints are employed for service under conditions involving high temperature as well as high pressure, and particularly when substantial fluctuations in temperature may take place, it has been found that such joints are subject to deformation and eventual leakage in service. It has been determined that such leakage is due to the fact that the flange studs or bolts are subject to thermal working or deformation, with eventual reduction in stud tension. This leads to fluid leakage at the flange gasket or seal weld.

In the present invention, the flange studs or bolts are purposely lengthened, far beyond the length required for a conventional flanged joint. External sleeves are provided to transmit compressive force against the flange. This force is exerted when the end nuts are tightened. Because the flange studs are lengthened, only a portion of the stud is heated in service. Thus, most of the stud is not subject to thermal deformation, and remains under tension in service. As a result, thermal deformation is readily absorbed by the balance of the stud and the sleeve, and the overall joint is constantly maintained under compressive stress by the studs, regardless of localized thermal expansion or deformation in a portion of the stud. This is a highly advantageous result, since a piping joint is provided which is eminently suited for high temperature and high pressure service, and particularly for service where temperature fluctuations or changes are encountered.

It is an object of the present invention to provide an improved piping joint.

Another object is to provide a piping joint for service under conditions of elevated temperature and pressure.

An additional object is to provide a flanged piping joint which continuously maintains compressive closure stress on the flanges.

A further object is to provide a flanged piping joint in which the closure studs remain under tension regardless of thermal deformation.

These and other objects and advantages of the present invention will become evident from the description which follows.

The figure is a longitudinal sectional view of a piping joint in accordance with the present invention.

Referring to the figure, a preferred embodiment of the apparatus of the present invention is presented. The overall piping joint extends between opposedly faced conduits 1 and 2. Since the joint is symmetrical about a central horizontal plane, the following discussion will refer primarily to the upper half of the joint. It will be evident that duplicate elements are provided for the lower half of the joint. Conduit 1 is attached to flange 3 by weld section 4. Flange 3 is typically flat faced and is joined to lower flange 5 which in turn is attached to conduit 2.

The interface between flanges 3 and 5 is sealed against fluid leakage by field weld 6, which is a plug seal only and does not provide any structural strength. Thus, in some cases weld 6 may be replaced by a suitable gasket, in which event the flanges 3 and 5 may alternatively be provided with another facing instead of flat face.

Stud elements 7 are extended through holes in flanges 3 and 5, and are provided with threaded ends. End nuts 8 are mounted on the ends of studs 7, and contact outer washers 9. Washers 9 are optional and may be omitted in some cases, since they merely serve to evenly distribute the compressive force exerted by nuts 8 when the nuts are tightened. Sleeves 10 are provided external to the stud 7, extending between the end nuts 8 and the flanges. Optional inner washers 11 may also be provided between each sleeve and the respective flange, in order to evenly distribute the compressive force exerted by the sleeve.

In service, the end nuts 8 are tightened, so as to place stud 7 under tension and thereby also exert a compressive force against sleeves 10. The sleeves 10 in turn serve to exert compressive force against the flanges, thereby maintaining a tight joint. Under service conditions of elevated temperature or fluctuating temperature, the portion of stud 7 adjacent to flanges 3 and 5 will become heated and will be subject to thermal deformation. However, due to the fact that stud 7 is lengthened, a substantial portion of the stud remains cool and under the tension generated by nuts 8. Thus, a substantially constant compressive force is exerted against the flanges, regardless of any deformation or thermal expansion of the central portion of stud 7. In other words, the end sections of stud 7 and the sleeve 10 may be visualized as acting as springs acting under tension and compression respectively, which exert a compressive force through sleeves 10 regardless of what happens at the central portion of the stud 7.

The inner surface of the flanges 3 and 5, which serves to form a passage for fluid passing through the conduits, is preferably insulated in order to reduce or eliminate any differential thermal expansion and deformation of the joint which may take place due to fluctuations in the temperature of the fluid passing through the conduits. Numerous insulation means may be provided to perform this function. A preferable mode of insulation is shown in the figure. This consists of a cylindrical baffle 12, which covers a recess in the inner surface of each flange. A ring 13 may be provided at the end of each baffle, in order to obtain improved stability and rigidity of the baffle against distortion or bending due to fluid flow. The inert body of fluid thus retained in the recess behind the baffle 12 serves as an effective insulating layer.

It will be evident that various alternatives may be practiced within the scope of the present invention. Thus, flanges 3 and 5 are shown as having built-up sections or extensions external to studs 7. This additional structural section is provided to produce greater rigidity in the flange body, and may be omitted in some cases.

It will be obvious to those skilled in the art that stud 7 may alternatively be replaced by a bolt having a fixed head at one end and a single screwed nut at the other end. In this case, the single nut is tightened to provide the entire bolt tension and the resultant compressive force needed to maintain a tight joint. In another alternative, only one end of the stud or bolt may be lengthened to provide the constant compressive force, with the other end being disposed adjacent to the flange in a conventional manner. Other alternatives of this nature will occur to those skilled in the art.

I claim:

1. A piping joint for high pressure and high temperature service which comprises two circular conduit sections with opposed ends presented for coupling, opposed circular flanges attached to the ends of said conduits, a plurality of elongated studs extending between said flanges, said studs having threaded ends, a plurality of threaded nuts, said nuts being attached to the ends of said studs, each of said studs being provided with two sleeves, each of said sleeves extending between a nut and the adjacent flange, whereby each sleeve is maintained under compression and said stud is maintained under tension when the end nuts are tightened on said stud, a plug seal weld extending between the faces of said flanges whereby fluid leakage is prevented, and insulation means provided over at least a portion of the inner surfaces of said flanges, said inner surfaces being exposed to fluid flowing within said conduits, whereby thermal stress in said joint due to fluctuation in fluid temperature is substantially prevented, said insulation means comprising a recess section in the inner surface of each of said flanges, together with a baffle mounted by its inner end in each flange and extending axially outwardly and in radially spaced relation to the walls of the recess section and terminating adjacent the radial face of said flange, said baffles defining a fluid passage which constitutes a uniform extension of the fluid passage within said conduits.

2. Apparatus of claim 1, in which a support ring is provided about the outer perimeter of the unsupported end of each of said baffles adjacent to the interface between said flanges, whereby distortion of said baffles due to fluid flow through said conduits is substantially prevented.

References Cited by the Examiner

UNITED STATES PATENTS

| | | | |
|---|---|---|---|
| 1,295,263 | 2/19 | Blom | 285—368 |
| 1,779,902 | 10/30 | Davies | 285—286 |
| 1,939,936 | 12/33 | Walker | 285—286 |
| 2,157,885 | 5/39 | Bailey | 285—286 |
| 2,646,997 | 7/53 | Magos | 285—187 |
| 2,695,184 | 11/54 | Hobbs | 285—187 |

FOREIGN PATENTS

| | | |
|---|---|---|
| 838,650 | 12/38 | France. |
| 914,489 | 6/46 | France. |
| 693,854 | 7/40 | Germany. |
| 450,292 | 7/36 | Great Britain. |
| 718,625 | 11/54 | Great Britain. |

CARL W. TOMLIN, *Primary Examiner.*